United States Patent
Aluc et al.

(10) Patent No.: US 11,966,393 B2
(45) Date of Patent: Apr. 23, 2024

(54) ADAPTIVE DATA PREFETCH

(71) Applicant: SAP SE, Walldorf (DE)

(72) Inventors: Gunes Aluc, Waterloo (CA);
Mohammed Abouzour, Waterloo (CA);
Bojana Bislimovska, Waterloo (CA)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 17/840,961

(22) Filed: Jun. 15, 2022

(65) Prior Publication Data
US 2023/0409573 A1 Dec. 21, 2023

(51) Int. Cl.
*G06F 16/2453* (2019.01)
*G06F 16/22* (2019.01)

(52) U.S. Cl.
CPC .... *G06F 16/24539* (2019.01); *G06F 16/2255* (2019.01); *G06F 16/24542* (2019.01)

(58) Field of Classification Search
CPC ....... G06F 2212/2022; G06F 16/24539; G06F 16/2255; G06F 16/24542
USPC ............... 707/711, 718, 741, 758, 802, 803; 711/118
See application file for complete search history.

(56) References Cited

U.S. PATENT DOCUMENTS

| | | | | |
|---|---|---|---|---|
| 8,019,742 B1* | 9/2011 | Baluja | ................... | G06F 16/951 |
| | | | | 707/706 |
| 11,221,792 B1* | 1/2022 | Zalucki | ................... | G06F 3/061 |
| 2007/0038837 A1* | 2/2007 | Ben-Zvi | ................ | G06F 12/109 |
| | | | | 711/E12.068 |
| 2013/0282709 A1* | 10/2013 | Zhu | ...................... | G06F 16/3322 |
| | | | | 707/767 |
| 2013/0332444 A1* | 12/2013 | Kondratova | ........ | G06F 16/9535 |
| | | | | 707/709 |
| 2017/0023927 A1* | 1/2017 | Kaushal | ............. | G05B 19/4065 |
| 2018/0198800 A1* | 7/2018 | Krasser | ............... | H04L 63/1416 |

* cited by examiner

*Primary Examiner* — Phong H Nguyen
(74) *Attorney, Agent, or Firm* — Buckley, Maschoff & Talwalkar LLC (57) ABSTRACT

A system includes reception of a request to fetch a first dataset, the request including a first identifier associated with the first dataset, determination, in response to the request, of a first signature associated with the first dataset based on the first identifier and on respective identifiers of one or more datasets fetched consecutively with the first dataset, and determination, based on the determined first signature, of whether to update a first link associating a second dataset with the first dataset, the link indicating to prefetch the first dataset in response to a request to fetch the second dataset.

11 Claims, 11 Drawing Sheets

| 0x | 13 | 4B | 24 | 9B |
|---|---|---|---|---|
| 0x | 43 | 4B | 83 | 09 |
| min | 13 | 4B | 24 | 09 |

ADAPTIVE DATA PREFETCH

BACKGROUND

A database system typically stores large amounts of data in the form of database tables. Client applications access this data by transmitting queries to the database system. For example, a database system receives a query from a client application, generates a query execution plan, executes the query execution plan upon its database tables, and returns a result set to the client application. During execution of the query execution plan, a query engine fetches required database pages from storage. Fetching consists of requesting retrieval of stored database pages and storage of those database pages in a buffer cache from which the query engine can efficiently manipulate the pages.

Database systems utilize prefetching techniques to improve performance. For example, database pages which are not yet required by a query engine but are expected to be requested by the query engine soon can be fetched and stored in the buffer cache prior to being requested. These prefetched database pages can be obtained directly from the buffer cache once they are requested by the query engine, thus avoiding extra I/O latency.

Conventional database management systems may use sequential prefetching and semantic prefetching, among other techniques, to identify which database pages should be prefetched. In sequential prefetching, it is determined to prefetch those database pages which are contiguous and physically stored with a fetched database page. According to semantic prefetching, the database pages to prefetch are determined based on the data structures and algorithms that are currently accessing the buffer cache. For example, if a tree node is fetched into the buffer cache, it may be determined to prefetch all of its child nodes.

Existing prefetching techniques are not suitable for certain operational scenarios. For example, existing prefetching techniques may work well under static workloads with well-defined characteristics but not under unpredictable, dynamic, varied workloads. Second, existing prefetching techniques trade accuracy for coverage, and therefore are more suitable for large buffer cache sizes. In scenarios providing a limited buffer cache, such inaccurate prefetching may cause thrashing where pages that are needed by the query engine are prematurely evicted from the buffer cache. Moreover, existing prefetching techniques do not provide tuning knobs for improving accuracy at the cost of space and/or computational efficiency. It is noted that cloud-based database systems, in particular, may experience dynamic workloads and operate under limited random access memory, hence the desirability of tuning knobs.

DETAILED DESCRIPTION

The following description is provided to enable any person in the art to make and use the described embodiments and sets forth the best mode contemplated for carrying out some embodiments. Various modifications, however, will be readily apparent to those in the art.

Some embodiments provide an adaptive prefetching technique to determine, based on a requested page, one or more pages to prefetch into the buffer cache of a database management system. Generally, embodiments generate data structures based on an incoming workload to learn which pages are fetched together and use this learning to determine pages to prefetch. The data structures, and therefore the learning, evolve based on changing incoming workload patterns.

For each fetched data page, a representation of data pages which were fetched contemporaneously (and/or consecutively) with the data page is determined. This representation is referred to herein as a signature of the fetched data page. Signatures associated with data pages are compared to identify pages which should be prefetched in response to the fetching of a given data page.

According to some embodiments, the signature of a data page is a hash of a sequence of identifiers of pages which were requested immediately prior to and/or subsequent to the data page. The hashing scheme may be locality-sensitive (e.g., MinHash) to facilitate comparison of sets of co-occurring fetch requests which are represented by the signatures. The MinHash hashing scheme may enable space- and computationally-efficient representations and comparisons.

Embodiments may provide accurate prefetching predictions after just a few page requests, thereby providing accuracy at the sake of coverage. Prefetching decisions can become more accurate as more pages are requested. Furthermore, accuracy and sensitivity can be controlled via various tuning knobs in exchange for memory consumption and/or computational complexity. Embodiments may be well-suited for deployment in systems such as cloud database management systems in which workloads are unpredictable and dynamic, and the size of the buffer cache may face strict limitations (e.g., due to cost).

Unlike sequential or semantic prefetching, some embodiments do not determine pages to prefetch based on their storage location with respect to a requested page or based on up-front assumptions about the expected workload. Moreover, the underlying clustering algorithm to update the data structures on each observation is computationally efficient and exhibits constant-time overhead.

Figure 1:
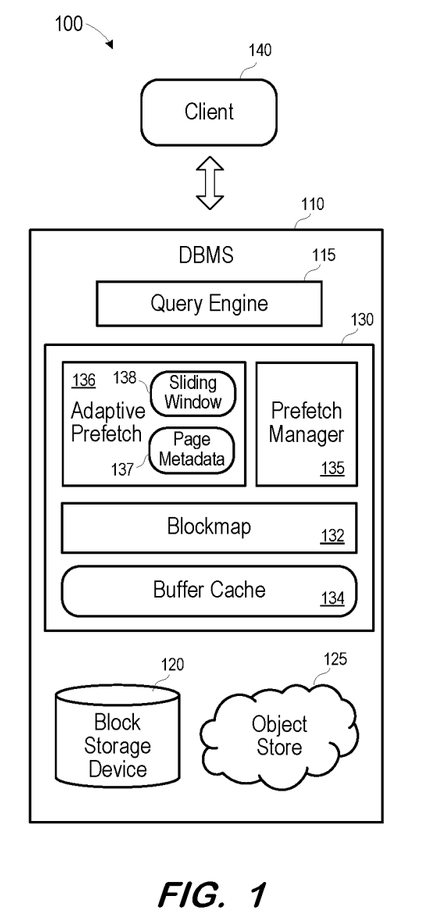
FIG. 1 is a block diagram of a database architecture implementing adaptive data prefetching according to some embodiments.

FIG. 1 is a block diagram of database architecture 100 implementing adaptive data prefetching according to some embodiments. Each illustrated element of architecture 100 may be implemented using any suitable combination of computing hardware and/or software that is or becomes known. Architecture 100 may comprise components of a standalone or distributed (i.e., multi-node) database system. In some embodiments, two or more elements of architecture 100 are implemented by a single computing device. One or more elements of architecture 100 may be implemented as a cloud service (e.g., Software-as-a-Service, Platform-as-a-Service).

Architecture 100 includes database management system 110, which may be implemented using one or more computer servers and/or any suitable combination of computing hardware and software. One or more components of system 110 may be located remote from one another and one or more components may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

Database management system 110 may comprise any query-responsive database system that is or becomes known, including but not limited to a structured-query language (i.e., SQL) relational database management system. According to some embodiments, system 110 is a columnar relational database management system designed for online analytical processing (OLAP) workloads and implements multi-version concurrency control (MVCC) with table-level versioning and snapshot isolation. Cloud-based implementations of a database management system according to some embodiments may be distributed, in which each database node is a cloud-based server which can be elastically added and removed from the system.

Generally, system 110 manages data of a database instance which is persisted in block storage device 120 and object store 125. Embodiments may utilize more than one block storage device and/or object store, and some embodiments may utilize only block storage devices or only object stores. Block storage device 120 persists system files and database pages which belong to any file-based database spaces managed by system 110. Object store 125, on the other hand, persists database pages which belong to any cloud-based database spaces managed by system 110. For example, object store 125 may include two different object stores provided by two different storage providers. Each object store may be associated with a separate cloud-based database space and may therefore persist database pages of its associated database space. Embodiments may allow a user to choose a storage provider based on price and performance characteristics, and to move data between different storage providers as needed.

System 110 executes queries received from client 140. Such queries may comprise create, read, update and delete operations associated with data of the database instance. Client 140 may comprise a server application which serves many users, and system 110 may in turn serve many such server applications. According to some embodiments, client 140 is a server application and both client 140 and system 110 are executed on a cloud platform which provides services thereto. Users may access client 140 via a Web-based user portal to the cloud platform.

Query engine 115 receives queries and requests associated logical pages from storage subsystem 130 using logical page identifiers. Storage subsystem 130 locates the correct version of a logical page in buffer cache 134 or, if not located in buffer cache 134, from persisted storage 120 or 125. Storage subsystem 130 utilizes blockmap 132 to determine the physical location of a logical page within storage 120 (i.e., according to block number) or within storage 125 (i.e., according to object key). The requested page is read from persisted storage 120 or 125 and cached in buffer cache 134 (e.g., in Random Access Memory) to optimize retrieval of the page in response to future requests for the page.

When a new logical page of a file-based database space is to be written to block storage device 120, suitable free physical blocks are identified using a freelist (not shown), the new logical page is written to the identified blocks, and blockmap 132 is updated to identify the block number at which the page was written. Upon receiving an instruction to persist an update to this logical page, blockmap 132 is navigated to identify the block number at which the corresponding physical page was written, and the physical page is updated in-place.

When a new logical page of a cloud database space is to be written, a unique object key is generated, and the new logical page is written to object store 125 using the unique object key. An update to an existing logical page of a cloud database space is not persisted as described above with respect to a logical page of a file-based database space, since, unlike a file, portions of an object cannot be re-written. Accordingly, to persist an update to an existing logical page of a cloud database space, another unique object key is generated, and the updated page is written to object store 125 as an object using the unique object key. Since the physical location of the page has changed, blockmap 132 is updated accordingly.

Query engine 115 may communicate directly with blockmap 132 to request pages which are required immediately. In some systems, query engine 115 also sends hints to prefetch manager 135 which allow prefetch manager 135 to identify pages that query engine 115 might request soon. Prefetch manager 135 is responsible for proactively populating the buffer cache 134 with the pages that may be requested soon based on the hints provided by query engine 115.

Adaptive prefetch component 136 tracks the logical page identifiers of the data pages requested by query engine 115. These logical page identifiers may be stored in sliding window 138 as will be described below. Sliding window 138 may be stored in heap memory according to some embodiments.

Figure 2:
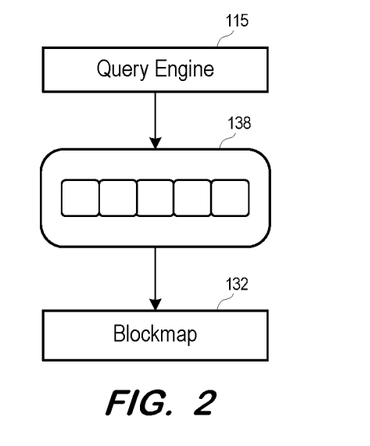
FIG. 2 is a diagram illustrating a sliding window data structure according to some embodiments.

FIG. 2 is a diagram illustrating sliding window data structure 138 according to some embodiments. Sliding window 138 records page requests sent from query engine 115 to blockmap 132. The page requests specify an identifier of a requested page. As will be described below, sliding window 138 stores the identifier of a requested page in its rightmost position and shifts any existing stored identifiers to the left. Accordingly, sliding window 138 of FIG. 2 maintains identifiers of the last five requested pages, in the order in which the pages were requested.

Sliding window 138 is not limited to five positions. Increasing the number of positions may increase the accuracy of resulting prefetches but also increases the memory (and perhaps computational resources) required to store signatures generated based on the larger sliding window 138.

Page metadata 137 stores, for a given data page, a signature representing other data pages which were previously fetched contemporaneously with the given data page. For example, the signature may represent logical page identifiers which were present in sliding window 138 at times during which the page identifier of the given page was also present in sliding window 138.

Page metadata 137 may also store, for a given data page, links to other data pages. The links may include a forward link to a first data page which should be prefetched if the given data page is fetched, and/or a backward link to a second data page which, if fetched, should result in prefetching of the given data page. The links of page metadata 137 are determined, or learned, based on the signatures and links of page metadata 137 according to some embodiments which will be described in detail below.

Page metadata 137 may also be stored in heap memory, in blockmap 132 (e.g., where each page's metadata is stored in the portion of blockmap 132 corresponding to the page), in persistent storage 120, or in any suitable location. Persistence of page metadata 137 allows the signatures and links learned during operation to be recovered after a crash. If stored outside blockmap 132, page metadata 137 can be deleted to forget the learned signatures and links without having to modify blockmap 132. "Forgetting" the signatures and links learned based on a workload pattern of incoming requests may be useful in a case that the workload pattern has changed significantly.

Figure 3:
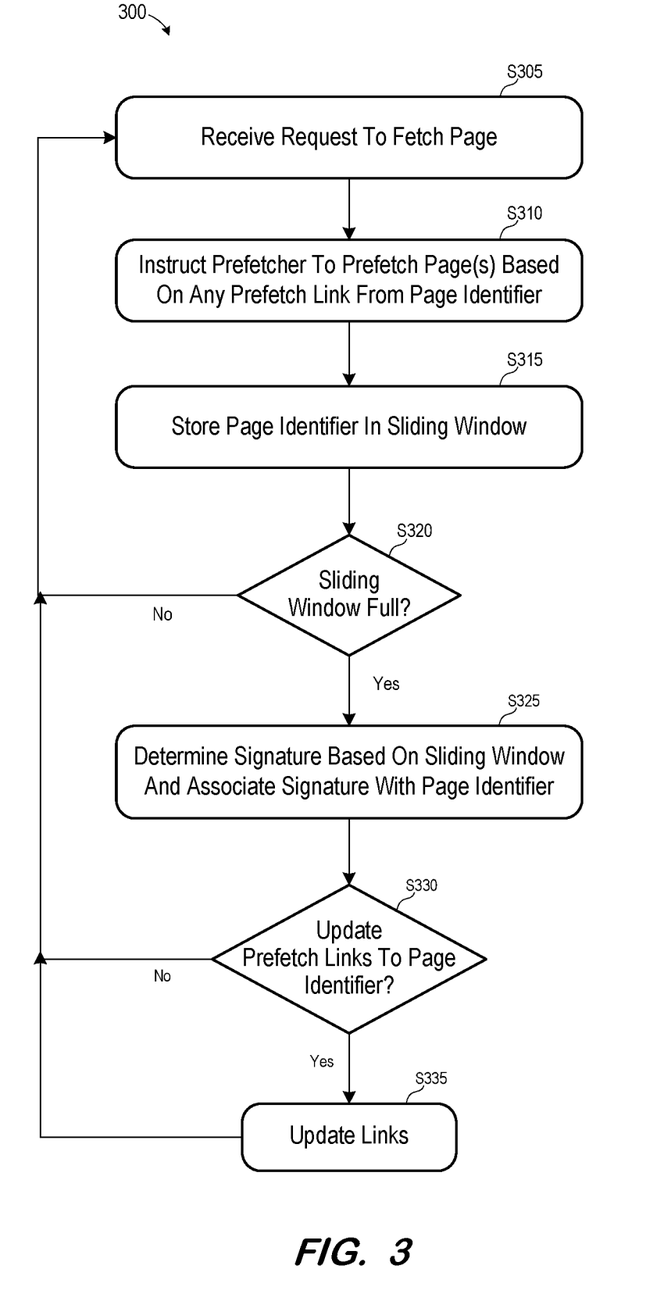
FIG. 3 comprises a flow diagram to generate workload-based data to facilitate adaptive data prefetching according to some embodiments.

FIG. 3 comprises a flow diagram to generate workload-based data to facilitate adaptive data prefetching according to some embodiments. In some embodiments, various hardware elements of system 110 execute program code to perform process 300. Process 300 and all other processes mentioned herein may be embodied in processor-executable program code read from one or more non-transitory computer-readable media, such as a hard disk drive, a volatile or non-volatile random access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

At S305, a request is received to fetch a page. With respect to the example of FIG. 1, the request may be received by storage subsystem 130 from query engine 115. The request may have been generated based on a query received from client application 140 and may include a logical page number or other identifier of the page to be fetched. As described with respect to FIG. 2, and in parallel with process 300, the request is received by blockmap 132, the page is retrieved from a physical location specified by blockmap 132 if not already in buffer cache 134, and the retrieved page is stored in buffer cache 134.

At S310, a prefetcher is instructed to prefetch one or more pages based on a prefetch link from an identifier of the requested page to an identifier of another page, if such a prefetch link exists. Prefetch links and their generation and use will be described below.

Next, an identifier of the requested page is stored in a sliding window at S315. The identifier may comprise a logical page identifier which was included in the request. It is then determined at S320 whether the sliding window is full. If not, flow returns to S305 and continues as described above until it is determined at S320 that the sliding window is full.

Figure 4A:
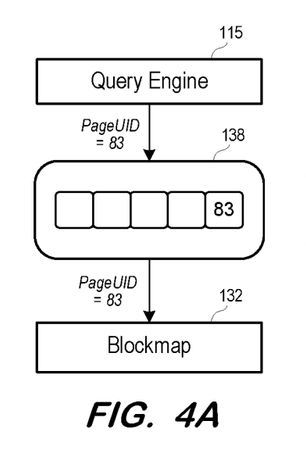
FIGS. 4A through 4E illustrate population of a sliding window based on page fetches according to some embodiments.
Figure 4B:
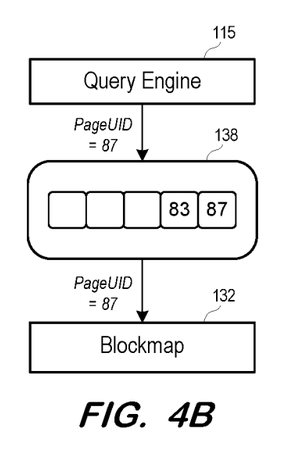
Figure 4C:
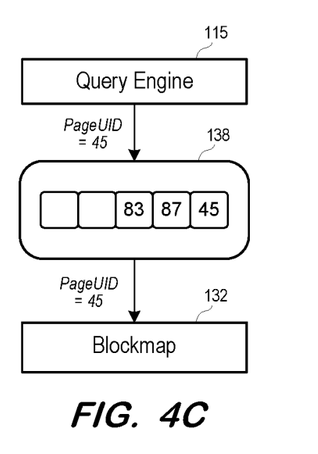
Figure 4D:
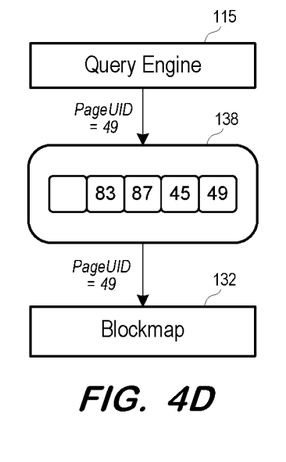
Figure 4E:
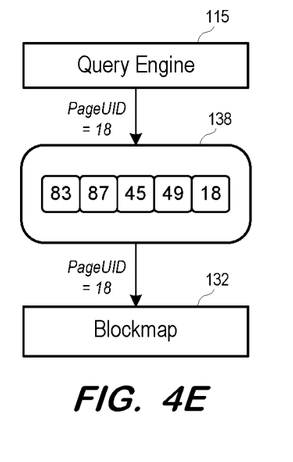

FIGS. 4A through 4E illustrate population of a sliding window based on page fetches according to some embodiments. Initially, as shown in FIG. 4A, a first page request is received from query engine 115 at S305 and a page identifier (i.e., 83) corresponding to the request is stored in a rightmost position of sliding window 138 at S315. Since sliding window 138 is not full, flow returns to S305 to receive another request and to store the corresponding page identifier (i.e., 87) in the rightmost position of sliding window 138 while shifting the prior page identifier to the left. While sliding window 138 remains not full, flow continues to receive requests for pages 45, 49 and 18 and to populate sliding window in response as described above and shown in FIGS. 4C-4E. During this time, a prefetcher is instructed to prefetch pages based on any forward prefetch links which may be associated with the requested page identifiers 83, 87, 45, 49 and 18.

Continuing the present example, it is determined at S320 that sliding window 138 is full after page identifier 18 is stored at S315. Flow then proceeds to S325 to determine a signature based on the sliding window and to associate the signature with the most-recently stored page identifier. Determination of the signature at S325 may include applying any locality-sensitive hashing algorithm or scheme to the page identifiers of the sliding window. Given a distance function (e.g., Jaccard distance) over an input set, such a scheme attempts to preserve the distances within its output values. Generation of a signature may allow storage of the page identifiers of the sliding window in significantly fewer bytes than would be required to store the identifiers, and comparison of "distances" between data pages, where distance is a measure of the likelihood of two pages being fetched together (e.g., smaller distance=greater likelihood).

Figure 5A:
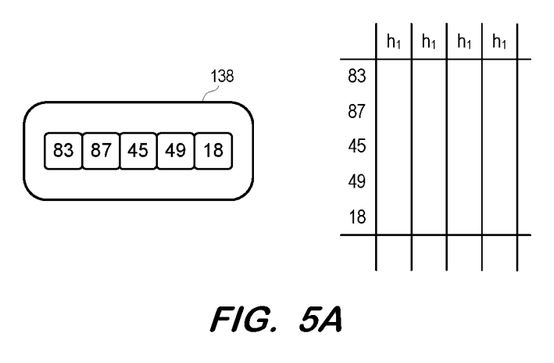
FIGS. 5A through 5C illustrate determination of a signature for a data page based on a sliding window according to some embodiments.
Figure 5B:
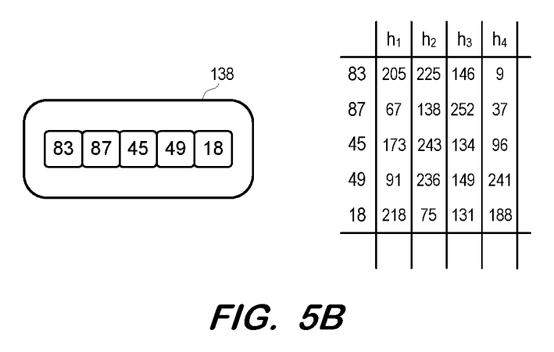
Figure 5C:
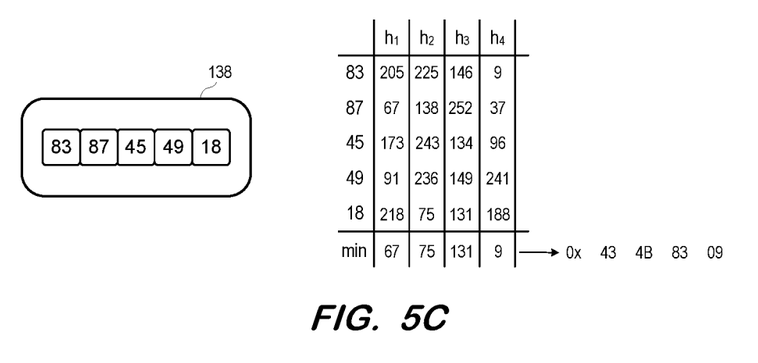

FIGS. 5A through 5C illustrate determination of a signature at S325 according to some embodiments. As shown in FIGS. 5A and 5B, each identifier of sliding window 138 is subjected to four different hash functions $h_1$, $h_2$, $h_3$, and $h_4$, each of which generates an output value ranging from 0 to 255. Embodiments are not limited to four hash functions or to this range of output values. The number of independent hash functions and/or the number of bytes output by each independent hash function can be increased as a trade-off between increased memory usage (and to some extent, computational performance) and improved prefetching accuracy.

The minimum hashed value (i.e., the minimum of all the outputs of functions $h_1$, $h_2$, $h_3$, and $h_4$) for each identifier is determined. As shown in FIG. 5C, the minimum values in the present example are 67, 75, 131, 9 (43, 4B, 83, 9 in hexadecimal). In some embodiments, the signature comprises the hexadecimal values in order to store each value of the signature using one byte. A size of the signature may be much smaller than a size of sliding window 138 because the page identifiers may include values much greater than 255.

Figure 6A:
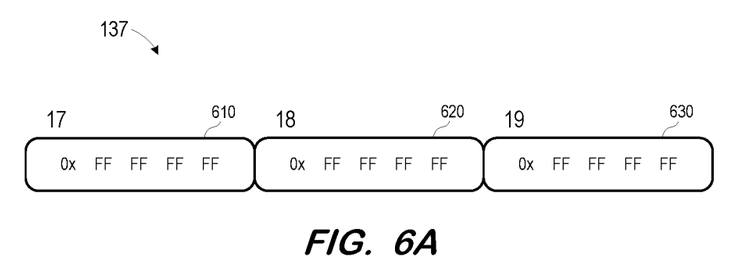
FIGS. 6A and 6B illustrate stored signatures associated with data pages according to some embodiments.

The signature is associated with the most-recently stored page identifier at S325. FIG. 6A depicts page metadata 137 which associates each page identifier with a signature according to some embodiments. As described above, metadata 137 may be stored in heap memory, in blockmap 132 or in persistent storage.

Figure 6B:
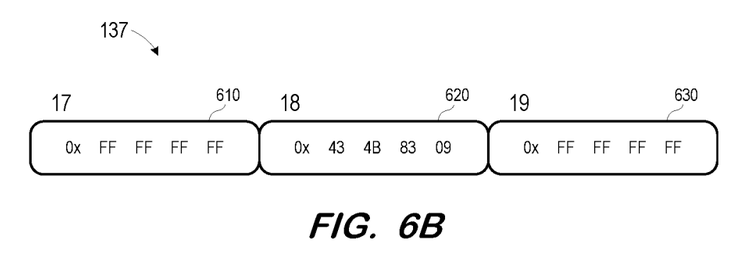

In FIG. 6A, metadata 610 associates page identifier 17 with signature FF FF FF FF, metadata 620 associates page identifier 18 with signature FF FF FF FF, and metadata 630 associates page identifier 18 with signature FF FF FF FF. Signature FF FF FF FF may comprise an initial value indicating that no signature has been determined for a given page identifier. FIG. 6B shows updating of metadata 620 at S325 to associate page identifier 18 with the determined signature 43, 4B, 83, 9.

Figure 7:
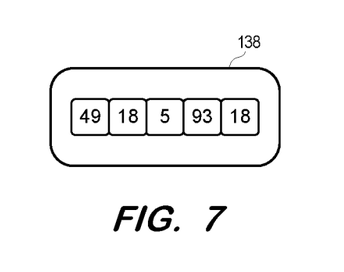
FIG. 7 illustrates population of a sliding window based on page fetches according to some embodiments.
Figure 8:
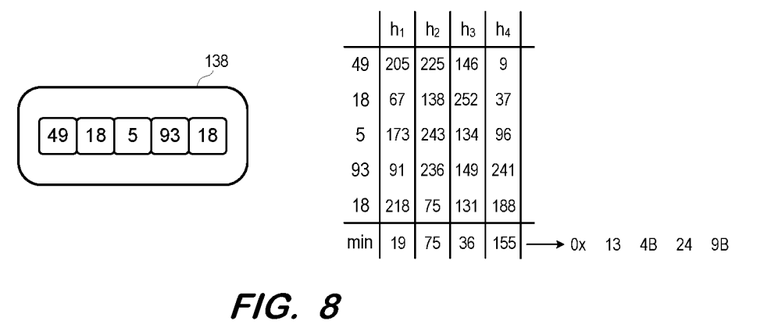
FIG. 8 illustrates determination of a signature for a data page based on a sliding window according to some embodiments.

Generally, a signature which is currently associated with a page identifier is updated with a newly-determined page identifier by determining the minimum value of each hash of the signature. For example, it will be assumed that sliding window 138 now includes the page identifiers shown in FIG. 7. FIG. 8 illustrates determination of signature 13 4B 24 9B based on the page identifiers of FIG. 7. Accordingly, in order to associate the newly-determined signature with rightmost page identifier 18, the current signature associated with page identifier 18 in metadata 137 is updated using the newly-determined signature.

Figure 9:
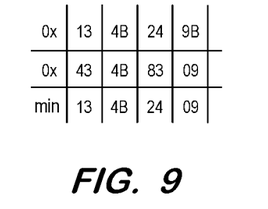
FIGS. 9 and 10 illustrates updating of a signature for a data page based on a newly-determined signature for the data page according to some embodiments.
Figure 10:
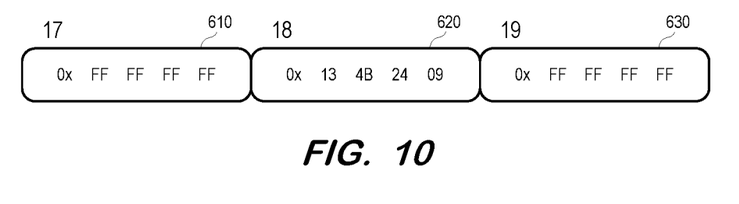

FIG. 9 shows both signatures and updated signature 13 4B 24 09. Each value of the updated signature is the minimum of the corresponding two values of the two input signatures. FIG. 10 further illustrates associating of the updated signature 13 4B 24 09 with page identifier 18 within metadata 620.

The updated signature represents the union of the sliding windows represented by the two input signatures. In particular, signature 43, 4B, 83, 9 represents page identifiers 83, 87, 45, 49 and 18 and signature 13 4B 24 9B represents page identifiers 49, 18, 5, 93 and 18. Accordingly, updated signature 13 4B 24 09 represents page identifiers 83, 87, 45, 49, 18, 5, 93 and 18.

Some embodiments operate to reduce the influence of old signatures (and their represented page identifiers) on currently-updated signatures by resetting each hash value of the signature that falls below a certain threshold (e.g., 0x 20) back to the maximum value for that hash function, or 0x FF in the present example. The lower the threshold, the more sliding window pages are represented (i.e., "remembered") in the current signature. Increasing the threshold therefore increases the sensitivity of the present system to changing workloads.

Returning to process 300, and after a determined signature is associated with a page identifier at S325, it is determined at S330 whether to update prefetch links associated with the page identifier. If so, those links are updated at S335 and flow returns to S305. If not, flow simply returns to S305.

As mentioned above, each page identifier may be associated with zero, one or two prefetch links according to some embodiments. The prefetch links associated with a page identifier may include a forward link to a first data page which should be prefetched if the data page associated with the page identifier is fetched, and/or a backward link to a second data page which, if fetched, should result in prefetching of the given data page associated with the page identifier.

Figure 11:
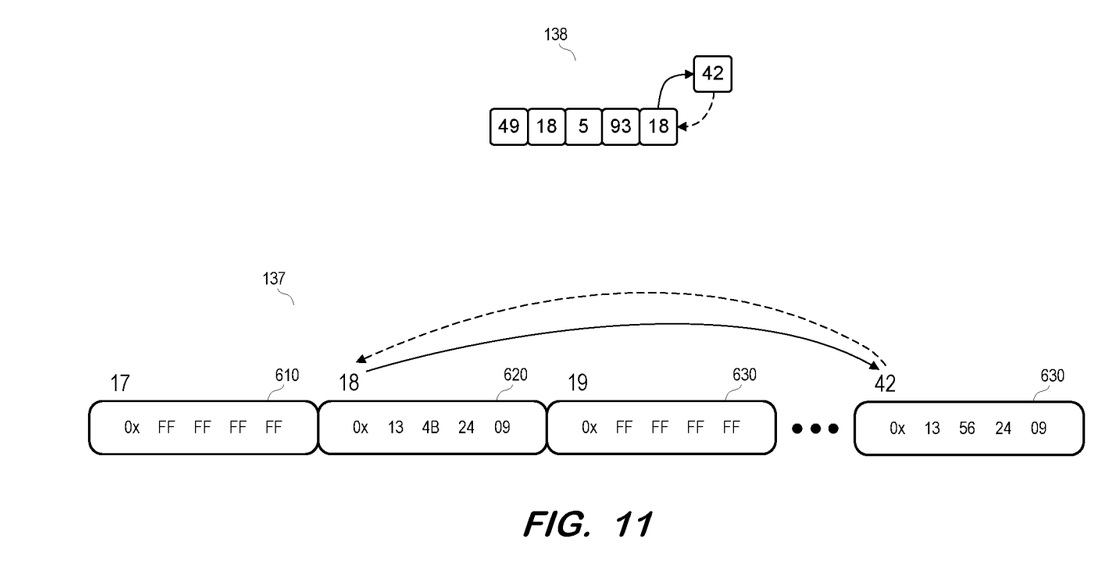
FIG. 11 illustrates forward and backward links associated with data pages according to some embodiments.

FIG. 11 illustrates prefetch links associated with page identifiers. Sliding window 138 includes page identifier 18, which is depicted as associated with a forward link to page identifier 42, and page identifier 42 is similarly depicted as associated with a backward link to page identifier 18. FIG. 11 also shows metadata 137 including the forward link from page identifier 18 to page identifier 42 and the backward link 42 from page identifier to page identifier 18. Any links associated with a page identifier may be stored along with its signature among page metadata 137.

After receiving a request to fetch page 18 at S305, the forward link from page identifier 18 is followed at S310 to instruct the prefetcher to prefetch page 42. It is noted that page identifier 42 may be associated with a forward link to another page identifier, that page identifier may be associated with a forward link to another page identifier, and so on. According to some embodiments, these forward links are followed to prefetch up to a predesignated maximum number (e.g., 3) of pages at S310. The predesignated maximum number can be adjusted to better utilize the buffer cache. In some embodiments, a forward link to prefetch the next page is followed only if the distance between the two pages (as defined below) is less than a user-defined threshold. This caveat may reduce false positive prefetches (i.e., prefetches of pages that are not actually needed in the near future), and thereby enhance buffer cache utilization.

Figure 12:
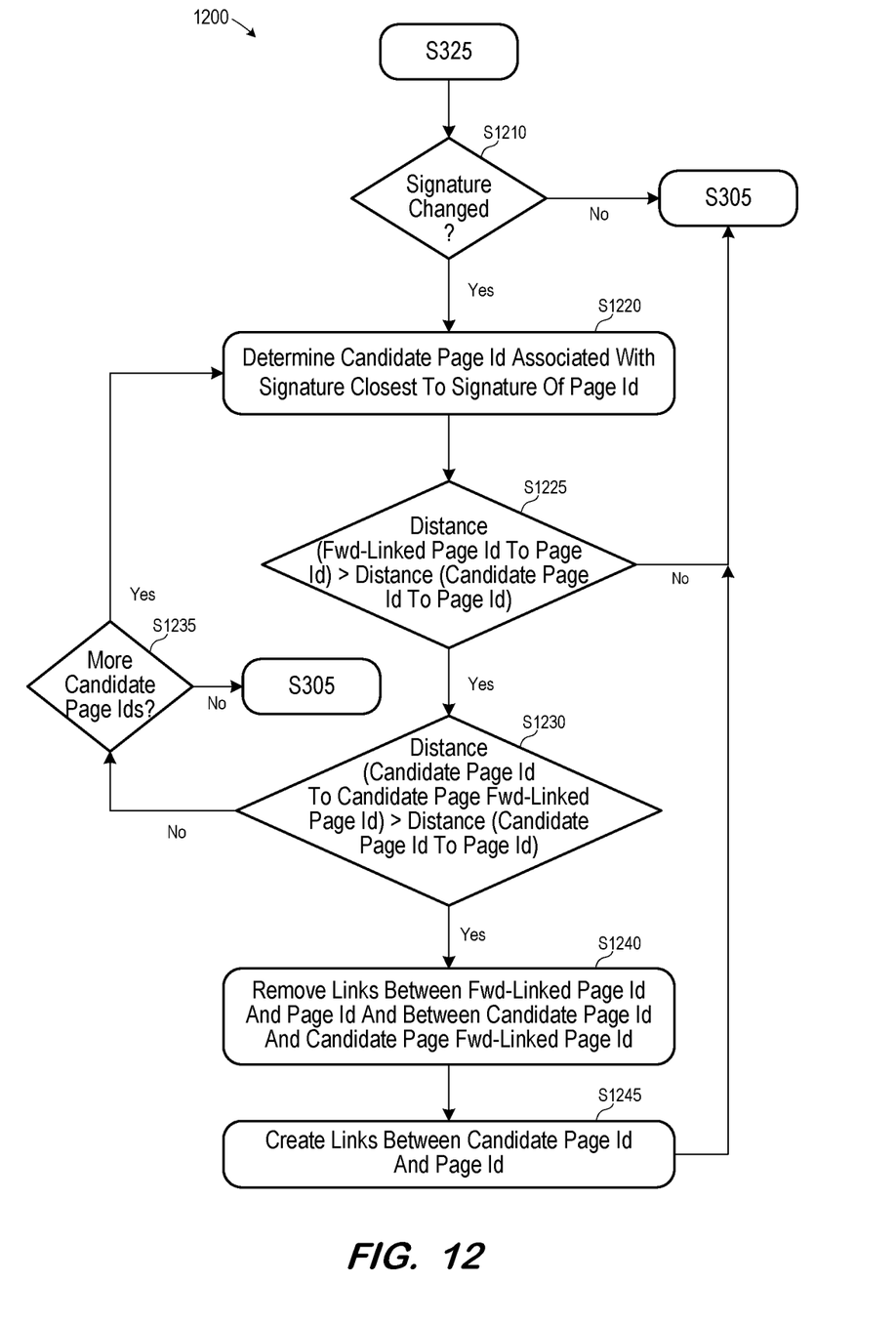
FIG. 12 comprises a flow diagram to update forward and backward links associated with data pages based on distances between data page signatures according to some embodiments.

Process 1200 of FIG. 12 is a detailed implementation of S330 and S335 according to some embodiments. Accordingly, process 1200 may be executed to determine whether to update prefetch links associated with a page identifier and, if so, to update those links.

At S1210, it is determined whether the signature associated with the requested page identifier changed at S325. For example, if the signature determined at S325 is identical to the signature which is currently associated with the page identifier, then the signature associated with the page identifier (and all other signatures of page metadata 137) remain unchanged. Since, as will be described below, the prefetch links are determined based on the signatures, these links should also remain unchanged. Flow therefore returns to S305 from S1210 if the signature associated with the requested page identifier is unchanged.

Flow proceeds to S1220 if the signature associated with the requested page identifier has changed. At S1220, a page identifier is determined which is associated with a signature that is "closest" to the signature associated with page identifier 18. The page identifier may be determined from a set of candidate page identifiers. In the present example, the candidate page identifiers are the page identifiers of the current sliding window.

Figure 13:
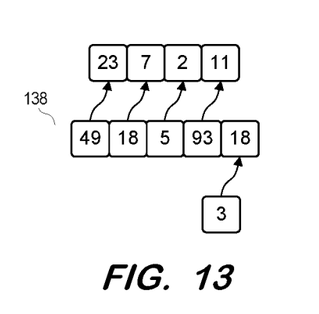
FIG. 13 illustrates forward and backward links associated with data pages of a sliding window according to some embodiments.

FIG. 13 illustrates sliding window 138 of the present example, as well as illustrations of forward links associated with page identifiers of the sliding window. Data representing each link may be stored in the page metadata associated with the page identifier from which the link points. Each illustrated forward link from a first page identifier to a second page identifier has a corresponding (unshown) backward link from the second page identifier to the first page identifier.

In some embodiments, no prefetch links exist in the page metadata on system startup. The prefetch links are generated in response to incoming page requests as described herein. As also mentioned herein, the prefetch links and other page metadata may be persisted such that any prefetch links which exist at the time of a system crash are available on system recovery.

The MinHash function approximates the Jaccard distance between any pair of logical page identifiers. More particularly, given two sets A and B, the Jaccard similarity is defined as the size of the intersection of the sets divided by the size of their union. The Jaccard distance is then defined as 1 minus the Jaccard similarity. Two signatures determined using the MinHash algorithm can therefore be used to determine the similarities (i.e., distance) between the two sliding windows which the signatures represent.

For example, to determine the Jaccard distance between signature 0x 13 4B 24 09 associated with page identifier 18 and signature 0x 13 56 24 09 associated with page identifier 42 of FIG. 11, the fraction of common values to total values (i.e., the Jaccard similarity) is first determined. The values 13, 24 and 09 of the five total values are common to each signature, resulting in a Jaccard similarity of 3/5. The Jaccard distance is 1−(Jaccard similarity)=2/5.

S1220 may therefore comprise determining the Jaccard distance between the signature associated with the current page identifier and the signature associated with each other page identifier of the current sliding window. According to the present example, the Jaccard distance is determined between the signature associated with page identifier 18 and the signatures associated with each of page identifiers 49, 5, and 93 (the second instance of page identifier 18 in the sliding window is skipped). For purposes of the present example, the Jaccard distances are determined as 0.4, 0.7, and 0.2, respectively. Page identifier 93 is therefore determined at S1220 as the candidate page identifier associated with a signature closest to the signature of page identifier 18.

Next, at S1225, it is determined whether the distance between a signature of a page identifier which is linked by a forward prefetch link to the current page identifier and the signature of the current page identifier is greater than the distance of the closest signature determined at S1220. If no page identifier is linked by a forward prefetch link to the current page identifier, the determination at S1225 is positive (i.e., the first distance is considered infinite). S1225 is intended to determine whether the strength of an existing forward prefetch link, if any, can be improved by replacing the forward link with a forward link from one of the candidate page identifiers. Flow returns to S305 of process 300 from S1225 if an existing forward prefetch link is stronger than any hypothetical forward link from one of the candidate page identifiers to the current page identifier.

For purposes of the present example, it will be assumed that the distance between the signature of page identifier 3 and the signature of page identifier 18 is 0.5. Accordingly, since 0.5 is greater than 0.2, it is determined at S1225 that a forward link between page identifier 93 and page identifier 18 would be stronger than the existing forward link between page identifier 3 and page identifier 18. Flow therefore proceeds to S1230.

At S1230, it is determined whether the distance between a signature of the candidate page identifier and the signature of a page identifier to which the candidate page identifier is forward-linked is greater than the distance of the closest signature determined at S1220. If the candidate page identifier is not forward-linked to any page identifier, the determination at S1230 is positive (i.e., the first distance is considered infinite). S1230 is intended to determine whether an existing forward link from the candidate page identifier should be removed and replaced with a forward link from the candidate page identifier to the current page identifier. Accordingly, S1230 determines whether the proposed forward link from the candidate page identifier would be stronger or weaker than the existing forward link.

As shown in FIG. 13, candidate page identifier 93 is forward-linked to page identifier 11 (as reflected in metadata of the candidate page identifier 93). The distance between the signatures of candidate page identifier 93 and page identifier 11 is assumed to be 0.1. Since 0.1 is not greater than 0.2, the existing forward link from page identifier 93 to page identifier 11 is stronger than a hypothetical forward link between page identifier 93 and page identifier 18, and flow continues to S1235 to determine whether more candidate page identifiers exist. If not, flow returns to S305.

Flow proceeds from S1235 to S1220 if more candidate page identifiers exist. In the present example, candidate page identifiers 49 and 5 remain to be evaluated. Of these candidate page identifiers, a page identifier is determined which is associated with a signature that is "closest" to the signature associated with page identifier 18. Since, as described above, the distances determined for candidate page identifiers 49 and 5 are 0.4 and 0.7, respectively, page identifier 49 is determined at S1220.

Next, at S1225, it is determined whether the distance between the signature of page identifier 3 and the signature of page identifier 18 (i.e., 0.5) is greater than the distance between the signature of page identifier 49 and the signature of page identifier 18 (i.e., 0.4). Since 0.5 is greater than 0.4, the determination at S1225 is positive and flow proceeds to S1230.

At S1230, it is determined whether the distance between a signature of the candidate page identifier (i.e., 49) and the signature of a page identifier to which the candidate page identifier is forward-linked (i.e., 23, per FIG. 13) is greater than the distance of the closest signature (i.e., 0.4) determined at S1220. The distance between the signatures of candidate page identifier 49 and page identifier 23 is assumed to be 0.9. Since the distance between the signatures of page identifier 49 and page identifier 23 is greater than the distance between the signatures of page identifier 49 and page identifier 18, it is determined that a hypothetical forward link between page identifier 49 and page identifier 18 would be stronger than the existing forward link from page identifier 49 to page identifier 23, and therefore the existing forward link may be replaced with the hypothetical forward link.

Figure 14:
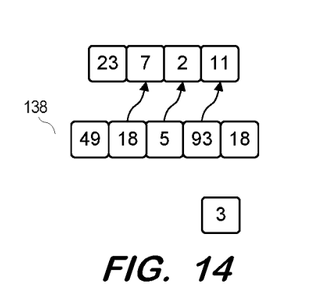
FIG. 14 illustrates removal of forward and backward links associated with data pages of a sliding window according to some embodiments.

Accordingly, at S1240, links between the forward-linked page identifier (i.e., 3) and the current page identifier are removed. Links between the candidate page identifier (i.e., 49) and the page identifier to which the candidate page identifier is forward-linked (i.e., 23) are also removed. FIG. 14 illustrates removal of the forward links between page identifier 3 and page identifier 18, and between page identifier 49 and page identifier 23. It should be noted that corresponding backward links between page identifier 18 and page identifier 3 and between page identifier 23 and page identifier 49 are also removed at S1240.

Figure 15:
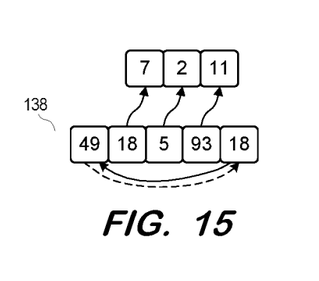
FIG. 15 illustrates creation of forward and backward links associated with data pages of a sliding window according to some embodiments.

At S1245, links between the candidate page identifier and the current page identifier are created. For example, and as illustrated in FIG. 15 a forward link to page identifier 49 is created in the metadata associated with page identifier 18 and a backward link to page identifier 18 is created in the metadata associated with page identifier 49. Flow then returns to S305 of process 300.

Embodiments are not limited to process 1200. In one approach, signatures of the entire set of logical page identifiers of the database are compared to find clusters of page identifiers which have a small (or zero) Jaccard distance therebetween. If a request for a page identifier is received from a query engine, all page identifiers in the same cluster as the requested page are prefetched.

According to some embodiments, a database system serves queries received from many different clients. According to some embodiments, a separate sliding window is used to record the fetches for each client, type of client (e.g., of a same department), or other suitable subset of clients.

Signatures for page identifiers are calculated and updated using each sliding window. This implementation may reduce interference due to requests coming from parallel clients which may have different workload characteristics.

In some embodiments, a signature associated with a page identifier not only when the page identifier enters the sliding window but also as it exits the sliding window. The signature may therefore represent the sets of fetch requests made before and after the fetch request for the page identifier, thereby potentially improving accuracy.

Still other embodiments may employ an ordering scheme and create a forward link f(i)=j only if i and j satisfy that ordering scheme, e.g., i<j or i>j. These embodiments may prevent cycles in the doubly-linked list of page identifiers generated as described above. Consequently, a larger chain of pages to be prefetched may be predicted.

Prefetched pages that are not used (i.e., evicted from the buffer cache before being accessed) can be fed back into the algorithm to adjust the relevance of the unused page by following the page's backward links (i.e., drop the forward link to the page or re-compute distances). Moreover, the number of unused prefetched pages may be monitored and used to control the maximum number of pages to be prefetched in each iteration.

Although embodiments are described herein with respect to data pages of database tables, embodiments may be implemented to adaptively prefetch any type of dataset in which each dataset is associated with a respective identifier.

Figure 16:
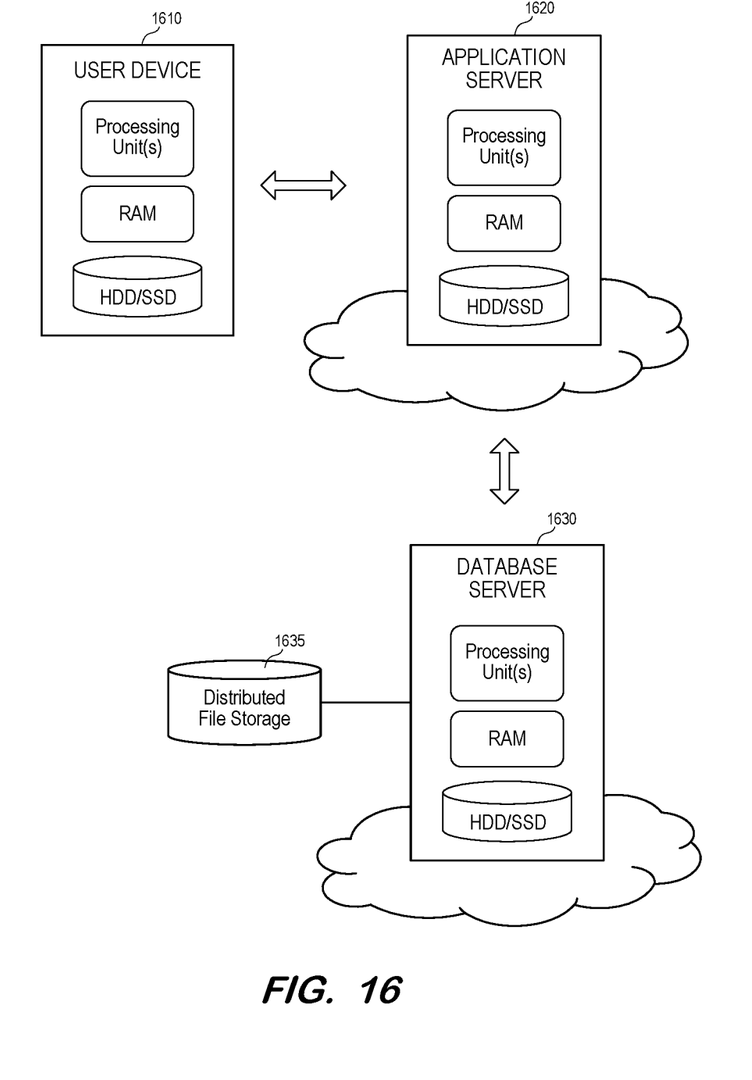
FIG. 16 is a view of a cloud-based architecture according to some embodiments.

FIG. 16 illustrates a cloud-based database deployment according to some embodiments. The illustrated components may reside in one or more public clouds providing self-service and immediate provisioning, autoscaling, security, compliance and identity management features.

User device 1610 may interact with applications executing on application server 1620, for example via a Web Browser executing on user device 1610, in order to create, read, update and delete data managed by database server 1630 and persisted in distributed file storage system 1635. Database server 1630 may store data and may execute processes as described herein to adaptively prefetch data based on incoming workloads as described herein. Application server 1620 and/or database server 1630 may comprise cloud-based compute resources, such as virtual machines, allocated by a public cloud provider. As such, application server 1620 and database server 1630 may exhibit demand-based elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory or Read Only Memory storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a storage system storing a plurality of database tables;
   a buffer cache; and
   a computer server to:
      receive a request to fetch a first dataset associated with one or more of the database tables, the request including a first identifier associated with the first dataset;
      determine a first signature associated with the first dataset by application of a locality-sensitive hashing algorithm to the first identifier and respective identifiers of one or more datasets fetched contemporaneously with the first dataset; and
      determine, by comparing a distance between the first signature and a second signature associated with a second dataset, whether to update a first link associating the second dataset with the first dataset, the link indicating that the first dataset should be prefetched and stored in the buffer cache in response to reception of a request to fetch the second dataset.

2. A system according to claim 1, the computer server further to:
   receive a request to fetch the second dataset; and
   in response to the request to fetch the second dataset and based on the first link, prefetch the second dataset and store the second dataset in the buffer cache.

3. A system according to claim 1, wherein determination of whether to update the first link comprises determination of a second distance between the first signature and a third signature associated with an identifier of the one or more datasets, and
   comparison of the first distance and the second distance.

4. A system according to claim 3, wherein determination of whether to update the first link comprises determination of a third distance between the third signature and a fourth signature associated with a fourth dataset, and
   comparison of the third distance and the second distance.

5. A method comprising:
   receiving a request to fetch a first dataset, the request including a first identifier associated with the first dataset;
   in response to the request, applying a locality-sensitive hashing algorithm to the first identifier and respective identifiers of one or more datasets fetched with the first dataset to determine a first signature associated with the first dataset; and determining, by comparing a distance between the first signature and a second signature associated with a second dataset, whether to update a first link associating the second dataset with the first dataset, the link indicating to prefetch the first dataset in response to reception of a request to fetch the second dataset.

6. A method according to claim 5, further comprising:
receiving a request to fetch the second dataset; and
in response to the request to fetch the second dataset and based on the first link, prefetching the second dataset and store the second dataset in a buffer cache.

7. A method according to claim 5, wherein determination of whether to update the first link comprises determination of a second distance between the first signature and a third signature associated with an identifier of the one or more datasets, and comparison of the first distance and the second distance.

8. A method according to claim 7, wherein determination of whether to update the first link comprises determination of a third distance between the third signature and a fourth signature associated with a fourth dataset, and comparison of the third distance and the second distance.

9. A non-transitory computer-readable medium storing program code executable by a processing unit of a computing system to:

receive a request to fetch a first dataset, the request including a first identifier associated with the first dataset;

in response to the request, apply a locality-sensitive hashing algorithm to the first identifier and respective identifiers of one or more datasets fetched with the first dataset; and determine, by comparing a distance between the first signature and a second signature associated with a second dataset, whether to update a first link associating the second dataset with the first dataset, the link indicating to prefetch the first dataset in response to a request to fetch the second dataset.

10. A medium according to claim 9, wherein determination of whether to update the first link comprises determination of a second distance between the first signature and a third signature associated with an identifier of the one or more datasets, and comparison of the first distance and the second distance.

11. A medium according to claim 10, wherein determination of whether to update the first link comprises determination of a third distance between the third signature and a fourth signature associated with a fourth dataset, and comparison of the third distance and the second distance.

* * * * *